3,289,734
SCALE DEPOSITION INHIBITION IN BLACK LIQUOR MULTIPLE EFFECT CONCENTRATION PROCESSES USING A STYRENE COPOLYMER
Reed S. Robertson, Glen Ellyn, Ill., assignor to Nalco Chemical Company, Chicago, Ill., a corporation of Delaware
No Drawing. Filed Aug. 17, 1965, Ser. No. 480,524
5 Claims. (Cl. 159—47)

The instant invention is concerned with an improved papermaking process. More specifically, the present invention relates to a method of improving operational efficiency of black liquor evaporators utilized in an overall papermaking process.

In the production of kraft paper by the so-called sulfate process, the bark and chipped wood are treated with an alkaline aqueous liquid to remove certain organic contaminants from the wood, of which lignin is the chief component. In a typical process, the chips are cooked in a 10% solution of sodium hydroxide which contains about 20 mole percent of sodium sulfide. This reaction is usually conducted at temperatures of approximately 170°–180° C. for a period of time ranging between 1 and 3 hours.

The resultant organic residues are removed from the chips by washing, which wash water contains dissolved lignin, emulsified soaps, other organic ingredients, and substantial amounts of inorganic salts and bases. This wash water is referred to as black liquor.

It is a common practice in large mills to recover the inorganic components of the liquor and to use the organic portion as fuel. As produced, the black liquor will usually contain about 12% by weight of solid material. Before the liquor can be used as fuel and the inorganic components recovered, it is necessary that the material be concentrated, usually to a solids content of about 45% by weight or higher. The concentration of black liquor is usually conducted in multiple-effect evaporators. These evaporators are ordinarily operated by employing the steam produced in the highest pressure evaporator to heat the next highest pressure evaporator. The flow of liquor is counter-current to the flow of pressure and steam. In evaporators containing black liquor of the lowest solids concentration, the steam used usually produces a vacuum in the system.

The black liquor itself will show variations in composition from mill to mill. However, in most instances, inorganic carbonates, sulfides, sulfites, sulfates and silica are present as well as organic sulfur compounds.

A common problem which rises with use of a black liquor multiple-effect evaporator is formation of substantial amounts of deposits which tend to stick to the interior walls or tubes of the evaporator units and remain in a tightly adherent state. A build-up of deposit formation results in a situation of measurably decreased overall efficiency of evaporation. For example, the deposit formation tends to materially decrease heat-transfer, requiring an increased heat input to accomplish desired evaporation. Likewise, the problem of deposition leads to more frequent boil-outs with hot water or acids and a substantial increase in down-time. Deposit formation can occur in any of the effects of the multiple-effect evaporator. There are usually 5 to 6 effects in each evaporator set, each effect containing a plurality of long-tube vertical units.

Various attempts have been made to use chemical agents to mitigate the problem of deposit formation, but by and large, their use has not been particularly successful. Prior art materials, such as those normally utilized to alleviate the problem of deposit formation in boilers, have shown little or no effect in overcoming the specific problem of deposit formation in black liquor evaporators.

It therefore becomes an object of the invention to provide a method of increasing the overall operational efficiency of a black liquor evaporator unit.

A more specific object of the invention is to provide a method of minimizing deposit formation in multiple effect evaporators employed to concentrate black liquor in a papermaking process.

Other objects will appear hereinafter.

In accordance with the invention, it has been found that deposit formation produced by the evaporation of water from black liquor via a multiple-effect evaporator may be substantially inhibited by treating said system with at least a deposit-inhibiting amount of a copolymeric resin characterized as a polyalkane resin having chemically integral therewith 25–50 mole percent of the reoccurring moieties represented by the formula:

where $R_1$ and $R_2$ when taken individually represent a radical selected from the group consisting of carboxyl, alkali metal and ammonium carboxylate and where $R_1$ and $R_2$ when taken together constitute the following radical:

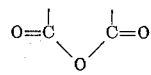

and 50–75 mole percent of the reoccurring moieties represented by the formula:

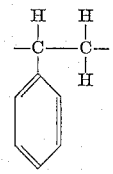

These materials are effective when added to the steam lines or to the vapor phase above the black liquor in any effect, when added to the black liquor directly being processed in any effect, or to any of the lines transferring the black liquor from effect to effect, or even to a dilute black liquor prior to any evaporation treatment. In a split treatment the additives may be used to treat the effect processing the weak liquor and may also be added to subsequent effects containing more concentrated liquor. Generally, however, it is preferred to add the treatment to the first effect whereby it will be available in any effect via carry-through with the black liquor.

The amount of treatment should be at least 0.1 p.p.m. and more preferably 0.5 p.p.m. of the deposit-inhibiting chemical based on weight of the black liquor. The dosage will, of course, fluctuate depending upon the conditions of the system and other variable factors, and, hence, dosages as high as 500 p.p.m. may be necessary under extraordinary conditions. Generally though the maximum dosage employed is about 50–100 p.p.m. In a typical system, 0.5–10 p.p.m. of treatment is added to the first effect whereby excellent deposit control is achieved. If needed, low dosages of chemical may be also added to subsequent effects.

The chemicals themselves are simply produced by copolymerizing styrene and maleic anhydride in proportions ranging from 3:1 to 1:1 on a molar basis. Subsequent to the polymerization, the anhydride moieties contained in the copolymer may be hydrolyzed with mineral acids to free acid or carboxyl groups which in turn may be neutralized with alkali metal hydroxides to form the corresponding alkali metal carboxylates. The salt derivatives may be directly produced by basic hydrolysis. Each of the derivatives is equally useful in the practice of the invention. It is important, as will be seen hereinafter, that the molecular weight of the additive be below about 10,000 and more preferably in the range of 500–5000. Materials of this type are commercially available, for example, under the name SMA resins sold by Sinclair Petrochemicals, Incorporated. One excellent copolymer is sold under the name SMA 1000 which can be used as such or hydrolyzed to the alkali metal salt.

The problem of preventing deposition of material upon the metal surfaces of the various units of a multiple-effect evaporator is particularly difficult to overcome in that the black liquor has a tendency to deposit out both inorganic and organic materials. The organic substances then act as a type of binder for the inorganic materials with the entire mass becoming a tightly adherent mass clinging to the metal surface walls of the evaporators. It is believed that the above phenomenon accounts for the reason whereby many prior art deposit inhibitors show little or no activity in inhibiting deposition of materials in a black liquor evaporator system.

The compositions of the invention may be used as such, prepared in a formulated product using water or polar organics such as aliphatic alcohols as diluents or may be employed with other materials which aid in maintaining the formed deposit in a well dispersed non-adherent form. It is believed that the role of the styrene-maleic anhydride copolymers is to prevent to a substantial degree growth of said deposits to a visible and deleterious form which could become attached to the evaporator metal surfaces.

Typical formulae containing the copolymers of the invention were prepared having the following compositions.

COMPOSITION I

| Components: | Percent by weight |
| --- | --- |
| Styrene-maleic anhydride copolymer (sodium salt, molecular weight 1600, 50% solution) | 27.0 |
| Potassium pyrophosphate (60% solution) | 25.0 |
| Water | 48.0 |

COMPOSITION II

| Components: | Percent by weight |
| --- | --- |
| Styrene-maleic anhydride copolymer (sodium salt, 50% solution, molecular weight, 1600) | 27.0 |
| Bisulfited tannin | 5.5 |
| Potassium pyrophosphate (60% solution) | 25.0 |
| Sodium lignosulfonate | 3.5 |
| Water | 39.0 |

Typical practices of the invention are set forth in the following examples. It is understood, of course, that these examples are merely meant to be illustrative, and the invention is not to be limited thereto.

*Example I*

In this run, Composition I was evaluated in a kraft pulp mill located in the southeastern area of the United States. This mill had a long duration problem of severe depositing in their black liquor evaporators. In this particular run the evaporators were pumping at about 220 gallons per minute, which was about the maximum which could be achieved.

10 p.p.m. of Composition I were added to the "weak" liquor coming to the 6th effect, which dosage was considerably stepped up on the 4th day. The tubes of the 2nd and 3rd body were then inspected and found to be entirely clean of deposit. Prior to the run, deposits of ⅛″–¼″ in thickness was present in these tubes. Likewise, the flow rate increased from 220 gallons/minute to 260 gallons/minute with benefit of chemical treatment. Excellent steam flow and high liquor Baumé were noted. This high flow rate continued for about 8 weeks, during which time no further treatment was needed due to the previously added slug of additive.

The same composition was also evaluated on a different set of evaporators in the same plant which pumped about 1,400 gallons/minute. At a dosage of 10 p.p.m. added to the 4th effect from the soap skimmer, the average running time between boil-outs was increased from an average of 5–6 days to 9–11 days. The Baumé on the liquor from the evaporators with benefit of chemical additive rose from approximately 25° to approximately 26°. Likewise, with advantage of chemical treatment, the rinse time or wash time on the evaporators was reduced from approximately 2 hours to approximately 1 hour.

*Example II*

Composition I was also evaluated in a kraft pulp mill located in the eastern portion of the United States. This Book and Bond Mill experienced severe deposit formation in their black liquor evaporators. The evaporator itself was a 5-stage, stainless steel Swenson countercurrent evaporator. Severe deposit formation was particularly noted in Stages 4 and 5. 23 p.p.m. of Composition I, based on an estimated throughput of 400 gallons/minute was added to the weak liquor ahead of the 5th stage evaporator. Deposit formation was substantially inhibited with benefit of chemical and time of boil-out of the system was considerably lessened due to the cleaner tubes.

*Example III*

In yet another mill trial, Composition I was evaluated and was found to increase evaporator efficiency 15% in terms of pounds of liquor per pound of steam used.

*Example IV*

In this mill dosages of 5–25 p.p.m. of Composition I resulted in an approximate 85% increase in total operating time between boil-outs of the black liquor evaporators. In one specific instance the time between a boil-out increased from 36.8 hours to 69.3 hours. There was also a corresponding decrease in downtime due to boil-outs. Likewise, the percent solids in the effluent from the 1st stage rose from 44.6% to 46.9%.

*Example V*

10 p.p.m. of Composition I was added to the third effect of a Goslin-Birmingham evaporator utilized in a kraft pulp mill located in the southeastern portion of the United States. This material was added to a feed pump as the black liquor came out of the soap skimmer. Without benefit of chemical treatment, the maximum amount of water from black liquor which could be evaporated was approximately 240,000#/hour and dropped off in 3–4 days to 200,000 or less. With benefit of chemical the flow started off higher at 260,000# of water evaporation/hour and only after 7 days did it drop to 240,000#/hour. The black liquor flow itself was also greater when chemical was present. Without chemical the black liquor flow was approximately 950 gallons/minute and in 3 or 4 days dropped to 850 gallons/minute. Only after this time was a boil-out carried out. The steam flow during chemical evaluation started off at 140,000#/hour and dropped to 130,000#/hour at the end of 7 days. Without the chemical the steam flow started at 130,000#/hour and dropped to 110,000#/hour.

The above data dramatically demonstrates material benefits achieved when the chemicals of the invention are present in a black liquor evaporator system.

*Example VI*

In this series of tests, the criticallity of molecular weight range of the resin additives was investigated. Specifically, it was determined that the molecular weight of the additives of the invention should be below about 10,000, and more preferably below about 5000. Higher molecular weight materials were surprisingly ineffective in inhibiting formation of deposits in multiple-effect evaporators used to process black liquors.

In these tests the effectiveness of the composition of the invention in preventing deposit formation was evaluated, employing the following test method. The test procedure was devised to substantially duplicate conditions which may occur in a black liquor evaporator. Specifically, an unstable, deposit-forming solution, hereinafter further described, was fed through a two-way solenoid valve, controlled by a timer, into a test vessel (400 ml.). The feed cycle can be varied from 0.5 to 15 minutes with an impulse time of 0.5 to 3 seconds. Normally the cycle occurs once every 15 minutes for 0.5 second. Fresh feed enters the test vessel near bottom and an equal volume of water is discharged by overflow to drain. The test specimens are ½″ O.D. sandblasted, stainless steel rods, 4¼″ long and drilled to receive 75 watt cartridge heaters. Degreased, dried and weighed test specimens were placed over heaters and suspended in test solutions in vessels. The tests were run for 24 hours at 145° F. using normal feed cycle and agitating test solutions by means of magnetic stirrers. At end of test period, stainless steel specimens were removed, dried and weighed, and weight gain recorded in milligrams after correcting for small metal loss due to corrosion. The corrected increase in weight is due to the deposit formed. Usual comparisons confirmed the correctness of weights. The deposit forming solution analysis showed 2400 p.p.m. total dissolved solids, 400 total hardness as calcium carbonate, 250 calcium hardness as calcium carbonate, 150 p.p.m. magnesium hardness as calcium carbonate, 500 p.p.m. chloride as sodium chloride, 1400 p.p.m. sulfate as sodium sulfate, and a total alkalinity of 250 p.p.m. Results of the series of tests are listed in Table I below. In each instance, 1 p.p.m. of a styrene-maleic anhydride copolymer (sodium salt) was employed as chemical additive. The performance is listed in terms of milligrams of deposit.

TABLE I

| Additive | Molecular weight | Acid # | Performance, mg. deposit |
|---|---|---|---|
| Styrene-maleic anhydride copolymer (sodium salt) | 1,600 | 500 | 9 |
| Do | 1,700 | 366 | 1 |
| Do | 700 | 415 | 13 |
| Do | 18–20,000 | 500 | 51 |
| Do | 70,000 | 240 | 52 |
| Blank | | | 25 |

As is readily apparent from the above test, the lower molecular weight materials exhibit excellent activity in inhibiting deposit formation, while those materials of relatively high molecular weight and generally above about 10,000 actually are worse than the blank, and cause an increase in deposit formation.

In this regard, in another mill trial a styrene-maleic anhydride (sodium salt) copolymer having a molecular weight of about 70,000 was employed as a potential additive in a multiple-effect black liquor evaporator system. This material exhibited little or no activity in preventing deposit formation.

As mentioned above, the compositions of the invention may be employed along with known dispersants which aid in maintaining any deposits formed in a dispersed state and in a soft, fluffy non-adherent condition. Such known dispersants as lignins, tannins, polyphosphates such as sodium or potassium pyrophosphate, etc., are typical dispersing aids. However, it was noted that use of these materials alone without benefit of styrene-maleic anhydride copolymer additive resulted in a situation of extreme deposit formation appearing on the metal surface of the evaporators. As a specific example, polyphosphates were repeatedly tested as possible deposit inhibitors in evaporation of black liquor. In no instance were passable results noted. As mentioned above, the compositions of the invention actually prevents formation of deposit nuclei, while the just discussed dispersants alone cannot prevent such nucleation, and only act as aids in dispersing small amounts of grown masses of material which may deposit on the metal surfaces. Thus, these materials are employed only as adjuvants along with the polymer resins in further promoting the aims of the invention.

The above discussed invention is effective in reducing deposit formation occurring upon a variety of metal surfaces. Protection is afforded equipment made of ferrous metals such as iron and steel or non-ferrous metals such as, for example, brass, which are or may be exposed to black liquor during evaporation, condensation, transportation, concentration, or other chemical and physical processing of black liquors.

The invention is hereby claimed as follows:

1. A method of inhibiting deposit formation on metal surfaces of a multiple-effect evaporator used for the processing of black liquor which comprises the step of treating said black liquor at any point prior to completion of said processing with a polymeric resin having a molecular weight less than 10,000 and characterized as a polyalkane having chemically integral therewith 25–50 mole percent of reoccurring moieties represented by the formula:

wherein $R_1$ and $R_2$ when taken individually represent a radical selected from the group consisting of carboxyl, alkali metal and ammonium carboxylate and where $R_1$ and $R_2$ when taken together constitute the following radical:

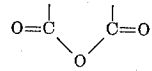

and 50–75 mole percent of reoccurring moieties represented by the formula:

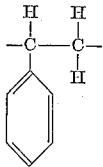

2. The method of claim 1 wherein said resin is added to said black liquor in an amount of at least 0.1 p.p.m.

3. The method of claim 2 wherein said resin is added in an amount ranging from 0.5 p.pm. to about 500 p.p.m.

4. The method of claim 1 wherein said resin is added to the first effect of said multiple-effect evaporator.

5. The method of claim 2 wherein said resin comprises 50% by weight of the first mentioned moiety where $R_1$ and $R_2$ are sodium carboxylate radicals, and 50% by weight of the second mentioned moiety.

References Cited by the Examiner

UNITED STATES PATENTS 2,578,259  12/1951  McMillan _____ 260—78.5
3,015,653   1/1962  Richards et al. _____ 260—78.5

FOREIGN PATENTS 577,244   6/1959  Canada.

NORMAN YUDKOFF, *Primary Examiner.*

J. SOFER, *Assistant Examiner.*